(12) United States Patent
Yanagiya et al.

(10) Patent No.: US 11,267,177 B2
(45) Date of Patent: Mar. 8, 2022

(54) INJECTION DEVICE

(71) Applicant: THE JAPAN STEEL WORKS, LTD., Tokyo (JP)

(72) Inventors: Takehiko Yanagiya, Hiroshima (JP); Toshio Toyoshima, Hiroshima (JP); Yutaka Nakagawa, Hiroshima (JP)

(73) Assignee: THE JAPAN STEEL WORKS. LTD., Tokyo (JP)

( * ) Notice: Subject to any disclaimer, the term of this patent is extended or adjusted under 35 U.S.C. 154(b) by 0 days.

(21) Appl. No.: 16/688,024

(22) Filed: Nov. 19, 2019

(65) Prior Publication Data

US 2020/0156299 A1  May 21, 2020

(30) Foreign Application Priority Data

Nov. 21, 2018  (JP) .............................. JP2018-217875

(51) Int. Cl.
*B29C 45/74* (2006.01)
*B29C 45/20* (2006.01)

(52) U.S. Cl.
CPC .............. *B29C 45/74* (2013.01); *B29C 45/20* (2013.01)

(58) Field of Classification Search
CPC ......... B29C 45/20; B29C 45/62; B29C 45/66; B29C 45/70; B29C 45/74; B29C 45/72; B29C 45/6707; B29C 45/67; B29C 45/6728; B29C 45/6778; B29C 2045/2792
See application file for complete search history.

(56) References Cited

U.S. PATENT DOCUMENTS

| | | | | | |
|---|---|---|---|---|---|
| 2,192,263 | A | * | 3/1940 | Johnson .................. | B29C 45/62 425/151 |
| 2,360,000 | A | * | 10/1944 | Lawyer .................. | B29C 45/20 425/186 |
| 2,705,342 | A | * | 4/1955 | Hendry ................. | B29C 48/832 425/156 |

(Continued)

FOREIGN PATENT DOCUMENTS

| | | |
|---|---|---|
| CN | 101468508 A | 7/2009 |
| CN | 103068548 A | 4/2013 |

(Continued)

OTHER PUBLICATIONS

Japanese Office Action dated Sep. 24, 2019 issued by the Japanese Patent Office in counterpart Japanese Application No. 2018-217875.

(Continued)

*Primary Examiner* — Niki Bakhtiari
*Assistant Examiner* — Emmanuel S Luk
(74) *Attorney, Agent, or Firm* — Sughrue Mion, PLLC

(57) ABSTRACT

A flange is formed on a heating cylinder in a vicinity of a center in a longitudinal direction and a predetermined joining plate adheres to the flange. A flange plate is provided on a support frame. The joining plate is fixed to the flange plate to attach and detach freely, and the heating cylinder is caused to be supported by the support frame. Accordingly, movement in an axial direction and rotation of the heating cylinder are restricted. A guide portion for positioning during attachment and detachment is provided on one or both of the joining plate and the flange plate.

7 Claims, 3 Drawing Sheets

(56) References Cited

U.S. PATENT DOCUMENTS

| | | | | |
|---|---|---|---|---|
| 2,766,483 A | * | 10/1956 | Stokes | B29C 45/72 |
| | | | | 425/447 |
| 2,954,586 A | * | 10/1960 | Wacker | B29C 45/462 |
| | | | | 425/449 |
| 3,267,524 A | * | 8/1966 | Morse | B29C 45/581 |
| | | | | 366/79 |
| 3,406,429 A | * | 10/1968 | Draudt | B29C 45/50 |
| | | | | 425/166 |
| 3,674,386 A | * | 7/1972 | Orth | B29C 45/70 |
| | | | | 425/1 |
| 4,133,460 A | * | 1/1979 | Jerpbak | B29C 45/62 |
| | | | | 138/177 |
| 4,846,652 A | * | 7/1989 | Hehl | B29C 45/1775 |
| | | | | 425/190 |
| 4,863,362 A | * | 9/1989 | Hehl | B29C 45/17 |
| | | | | 425/190 |
| 4,877,389 A | * | 10/1989 | Hehl | B29C 45/17 |
| | | | | 425/190 |
| 4,908,169 A | * | 3/1990 | Galic | B29C 48/65 |
| | | | | 264/410 |
| 5,417,558 A | * | 5/1995 | Heindel | B29C 45/07 |
| | | | | 264/40.7 |
| 5,421,712 A | * | 6/1995 | Laing | B29C 45/5008 |
| | | | | 264/40.7 |
| 5,460,507 A | * | 10/1995 | Takatsugi | B29C 45/58 |
| | | | | 264/328.14 |
| 5,811,136 A | * | 9/1998 | Morita | B29C 45/1773 |
| | | | | 425/190 |
| 5,983,978 A | | 11/1999 | Vining et al. | |
| 6,059,012 A | | 5/2000 | Vining et al. | |
| 7,497,680 B2 | * | 3/2009 | Diaconu | B22D 17/007 |
| | | | | 425/550 |
| 2002/0160071 A1 | | 10/2002 | Kestle et al. | |
| 2009/0025901 A1 | | 1/2009 | Diaconu | |
| 2011/0316191 A1 | | 12/2011 | Di Simone | |
| 2016/0279854 A1 | * | 9/2016 | Fitzpatrick | B29C 45/74 |
| 2018/0085984 A1 | * | 3/2018 | Porod | B29C 45/17 |
| 2019/0202086 A1 | * | 7/2019 | Oishi | B29B 7/48 |

FOREIGN PATENT DOCUMENTS

| | | |
|---|---|---|
| CN | 103568207 A | 2/2014 |
| CN | 204749182 U | 11/2015 |
| CN | 105108983 A | 12/2015 |
| CN | 207735555 U | 8/2018 |
| JP | 62-13310 A | 1/1987 |
| JP | 8-52775 A | 2/1996 |
| JP | 2002-511800 A | 4/2002 |
| JP | 2005-335072 A | 12/2005 |
| JP | 4219684 B2 | 2/2009 |

OTHER PUBLICATIONS

Japanese Office Action dated Oct. 29, 2019 issued by the Japanese Patent Office in counterpart Japanese Application No. 2018-217875.
Office Action dated Mar. 4, 2021 by the German Patent Office in counterpart German Patent Application No. 102019217824.3.
Communication dated Mar. 3, 2021, from the China National Intellectual Property Administration in Application No. 201911132266.0.

* cited by examiner

INJECTION DEVICE

CROSS-REFERENCE TO RELATED APPLICATIONS

This application is based on and claims priority under 35 USC 119 from Japanese Patent Application No. 2018-217875 filed on Nov. 21, 2018, the contents of which are incorporated herein by reference.

TECHNICAL FIELD

The present disclosure relates to an injection device provided in an injection molding machine and has features in a heating cylinder including the injection device and a support frame that supports the heating cylinder. Also, the present disclosure relates to an injection device suitable for an injection device of a metal injection molding machine that injects a metal material though it is not limited thereto.

BACKGROUND ART

The injection device, which injects an injection material into a mold, is a main device configuring the injection molding machine with a mold clamping device that clamps the mold. The injection device is configured by a heating cylinder, a screw configured to be driven in an axial direction and a rotation direction inside the heating cylinder, a frame supporting the heating cylinder, a drive mechanism that drives the screw, and the like. Generally, the frame is configured by a front plate, a rear plate coupled to the front plate by a predetermined coupling bar, and an intermediate plate provided between the front plate and the rear plate. An end portion of the heating cylinder is fixed to the front plate to be supported by the frame in the form of a cantilever beam. The rear end portion of the screw is provided to rotate freely on the intermediate plate such that the screw is rotated by a rotation drive mechanism provided on the intermediate plate. The screw is also driven in the axial direction by an axial direction drive mechanism provided between the intermediate plate and the rear plate.

Since the injection device causes an injection nozzle of the distal end to touch the mold at a predetermined touching force, the frame is driven forward at a predetermined driving force. At this time, the front plate pushes the heating cylinder in the axial direction and the heating cylinder receives axial compression. The heating cylinder is a so-called long column, the length of the heating cylinder in the axial direction being long as compared to the cross-sectional area, and the strength of the heating cylinder with respect to buckling is a problem. In a case in which the temperature distribution in the heating cylinder is asymmetrical, that is, when there is a difference between the top-side temperature and the bottom-side temperature, bending of the heating cylinder may occur due to buckling. This bending occurs easily in a long heating cylinder in a large injection molding machine. Furthermore, the bending occurs easily in a case of a heating cylinder of a metal injection molding machine in which it is necessary to form the heating cylinder from a heat-resistant metal. This is because the metal material is expensive and the heating cylinder is formed thinly to suppress the cost.

An injection device which prevents bending caused by buckling of a heating cylinder is described in Japanese Patent No. 4219684 (PTL 1). Although FIG. 3 schematically illustrates an injection device 50 described in PTL 1, a heating cylinder 51 which configures the injection device 50 is configured from a first barrel portion 52 of the front and a second barrel portion 53 of the rear. The first barrel portion 52 is formed to have a large outer diameter and a flange portion 55 having an expanded diameter is formed on the rear end portion of the first barrel portion 52. The outer diameter of the second barrel portion 53 is small as compared to that of the first barrel portion 52 and a flange portion 56 is formed on the distal end portion of the second barrel portion 53. In the heating cylinder 51, the flange portions 55 and 56 of the respective first and second barrel portions 52 and 53 are fastened to each other by bolts to be integrated. The bolts for fastening are not illustrated in FIG. 3. Since the heating cylinder 51 is configured in this manner, an expanded diameter portion is formed in the heating cylinder 51 by the flange portions 55 and 56 at an intermediate portion close to the front in the axial direction. Although a frame 58 which supports the heating cylinder 51, that is, a carriage assembling body is only illustrated in part in FIG. 3, the frame 58 is provided with a predetermined hollow frame structure, that is, a cradle 60 which stores a bottom end portion vicinity from a central portion of the heating cylinder 51. A first coupling portion 61 is provided on the distal end portion of the cradle 60 and a second coupling portion 62 is provided on the rear end portion of the cradle 60. In order to attach the heating cylinder 51 to the frame 58, the flange portions 55 and 56 of the heating cylinder 51 are connected to the first coupling portion 61 of the cradle 60, and the rear end portion of the heating cylinder 51 is connected to the second coupling portion 62, respectively. A predetermined yoke member 64 provided with an opening portion is inserted into the heating cylinder 51 from the distal end of the heating cylinder 51, and the yoke member 64 and the first coupling portion 61 are fixed to each other by using bolts. Therefore, the flange portions 55 and 56 are interposed between the yoke member 64 and the first coupling portion 61 and a state in which movement in the axial direction is restricted is assumed. Meanwhile, the rear end portion of the heating cylinder 51 is inserted into the second coupling portion 62 and a state in which rotation is restricted is assumed. In other words, the heating cylinder 51 is supported by the frame 58 in a state in which movement in the axial direction in the flange portions 55 and 56 is restricted and rotation in the rear end portion is restricted. Since the heating cylinder 51 is supported in this manner, when the injection device 50 is driven forward to cause an injection nozzle 66 to touch the mold, the force of axial compression acting on the heating cylinder 51 mainly acts on the first barrel portion 52 and it is possible to prevent deformation caused by buckling. PTL 1 describes a necessity to form the yoke member 64 at a predetermined thickness such that the yoke member 64 is capable of withstanding the nozzle touching force.

SUMMARY

In the injection device 50 described in PTL 1, since the flange portions 55 and 56 are formed at the central part close to the front of the heating cylinder 51 and the frame 58 supports the heating cylinder 51 at the flange portions 55 and 56, when the injection device 50 is driven forward to cause the injection nozzle 66 to touch the mold, deformation caused by buckling does not occur easily in the heating cylinder 51. In other words, the injection device 50 is excellent as compared to the injection device of the related art. However, problems to be solved are observed. First, it is possible to exemplify a point in that the yoke member 64 is especially necessary for the attachment of the heating cylinder 51 to the frame 58. Since a predetermined thickness is necessary for the yoke member 64, the yoke member 64 consequentially becomes large and the cost increases. When attaching the heating cylinder 51 to the frame 58, the yoke member 64 must be inserted from the distal end of the heating cylinder 51 as described earlier. Therefore, there is a problem in that the attachment work of the heating cylinder 51 becomes complicated. Similarly, the removal work of the heating cylinder 51 from the frame 58 also becomes complicated. Problems are also observed in the strength of the injection device 50 described in PTL 1 with respect to torsion of the heating cylinder 51. The rear end portion of the heating cylinder 51 is connected to the second coupling portion 62, rotation is restricted only at this portion, and the first coupling portion 61 and the yoke member 64 which interpose the flange portions 55 and 56 do not restrict the rotation of the heating cylinder 51. When the injection material is plasticized, a screw which is not illustrated is rotated, and a shearing force caused by the torsion acts on the heating cylinder 51. Although the torsion force effectively acts in a uniform manner in the axial direction on the heating cylinder 51, since the restriction of the rotation is only applied to the rear end portion, the torsion force acting uniformly from the distal end portion to the rear end portion accumulates at the rear end portion, and stress caused by the shearing force is focused. Since the heating cylinder 51 is formed such that the second barrel portion 53 is thin, there is a problem in that deformation caused by the torsion in the vicinity of the rear end portion occurs easily.

Illustrative aspects of the present disclosure provide an injection device in which there is no concern of deformation caused by buckling of a heating cylinder when an injection nozzle touches a mold, even if the heating cylinder is long, special members are not necessary and work is easy in the attachment and the removal of the heating cylinder with respect to a frame, and there is no problem in the strength of the heating cylinder with respect to torsion.

Illustrative aspects of the present disclosure are directed to an injection device, which is configured by a heating cylinder, a screw provided to be drivable in an axial direction and a rotation direction inside the heating cylinder, and a support frame supporting the heating cylinder, as a target and configured to support the heating cylinder on the support frame in a state in which movement in the axial direction and rotation are restricted at a predetermined support position in the vicinity of the center in a longitudinal direction of the heating cylinder. Specifically, the support position is a position at ⅓ to ⅔ of the length of the heating cylinder. A flange is formed on the heating cylinder at the support position and a predetermined joining plate adheres to the flange. The support frame is provided with a flange plate. When the joining plate is fixed to the flange plate to attach and detach freely, it is possible to cause the support frame to support the heating cylinder. Guide portions are provided on one or both of the joining plate and the flange plate for positioning during attachment and detachment.

According to a first illustrative aspect of the present disclosure, there may be provided an injection device comprising: a heating cylinder; a screw provided to be drivable in an axial direction and a rotation direction inside the heating cylinder; and a support frame supporting the heating cylinder, wherein the heating cylinder is supported by the support frame in a state in which movement in the axial direction and rotation are restricted at a support position, the support position being a position close to a distal end portion by ⅓ to ⅔ of a length of the heating cylinder from a rear end portion of the heating cylinder.

According to a second illustrative aspect of the present disclosure, in the injection device according to the first illustrative aspect, a flange may be formed on the heating cylinder at the support position, the support frame may include a flange plate, and the heating cylinder may be supported by the support frame due to the flange being fixed to the flange plate.

According to a third illustrative aspect of the present disclosure, in the injection device according to the second illustrative aspect, a joining plate may be fixed to the flange, the flange may be detachably fixed to the flange plate via the joining plate, a guide portion may be formed on one or both of the joining plate and the flange plate, and the joining plate may be positioned by the guide portion when being fixed to the flange plate.

As described above, the present disclosure provides an injection device, which is configured by a heating cylinder, a screw provided to be drivable in an axial direction and a rotation direction inside the heating cylinder, and a support frame supporting the heating cylinder, as a target. In the present disclosure, the heating cylinder is supported by the support frame in a state in which movement in the axial direction and rotation are restricted at a predetermined support position, the support position being a position close to the distal end portion by ⅓ to ⅔ of the length of the heating cylinder from the rear end portion of the heating cylinder. Therefore, even if the heating cylinder is long, since the heating cylinder is supported by the support frame in a state in which movement in the axial direction is restricted in the vicinity of the center in the longitudinal direction, when the support frame is driven in the axial direction to cause the injection nozzle to touch the mold, an axial force acting on the heating cylinder acts only in a range from the vicinity of the center to the distal end. Therefore, even if the heating cylinder is long, the range over which the axial force acts is short and it is possible to prevent deformation of the heating cylinder caused by buckling. Although, the heating cylinder is supported by the support frame in a state in which rotation is restricted, only the rotation of the vicinity of the center is restricted. Therefore, the shearing stress caused by torsion acting on the heating cylinder is small and it is possible to prevent deformation of the heating cylinder. To describe in detail, the torsion force acting on the entirety of the heating cylinder through the screw rotating is equal in the heating cylinder in the present disclosure and in the heating cylinder of the related art which restricts the rotation at the rear end portion of the heating cylinder. Although the torsion force accumulates in the vicinity of the center and acts on the support frame even in the heating cylinder of the present disclosure, the magnitude of the torsion force is an equal magnitude to that of the heating cylinder of the related art. However, the shearing stress acting on the heating cylinder itself in the present disclosure is approximately half the magnitude of the shearing stress in the heating cylinder of the related art. This is because the torsion force contributing to the shearing stress is merely equivalent to half the length of the heating cylinder. According to another disclosure, a flange is formed on the heating cylinder at a support position, a support frame is provided with a flange plate, and the heating cylinder is supported by the support frame due to the flange being fixed to the flange plate. Since it is possible to fix the heating cylinder to the support frame by merely fixing the flange to the flange plate, it is easy to attach the heating cylinder, and special members are not necessary. According to still another disclosure, a predetermined joining plate is fixed to the flange, the flange is detachably fixed to the flange plate via the joining plate, a guide portion is formed on one or both of the joining plate and the flange plate, and the joining plate is positioned by the guide portion when being fixed to the flange plate. Although it is necessary to remove, attach, and the like the heating cylinder with respect to the support frame during maintenance of the injection device, since it is possible to perform positioning using the guide portion, the attachment and detachment work of the heating cylinder becomes extremely easy.

BRIEF DESCRIPTION OF DRAWINGS

Illustrative embodiments of the present disclosure will be described in detail based on the following figures, wherein:

FIGS. 2A and 2B are diagrams illustrating a portion of the injection device according to the illustrative embodiment of the present disclosure, in which FIG. 2A is a perspective view illustrating a portion of a heating cylinder and a portion of a support frame, and FIG. 2B is a front sectional diagram illustrating a portion of the heating cylinder and a portion of the support frame.

DETAILED DESCRIPTION

Figure 1:
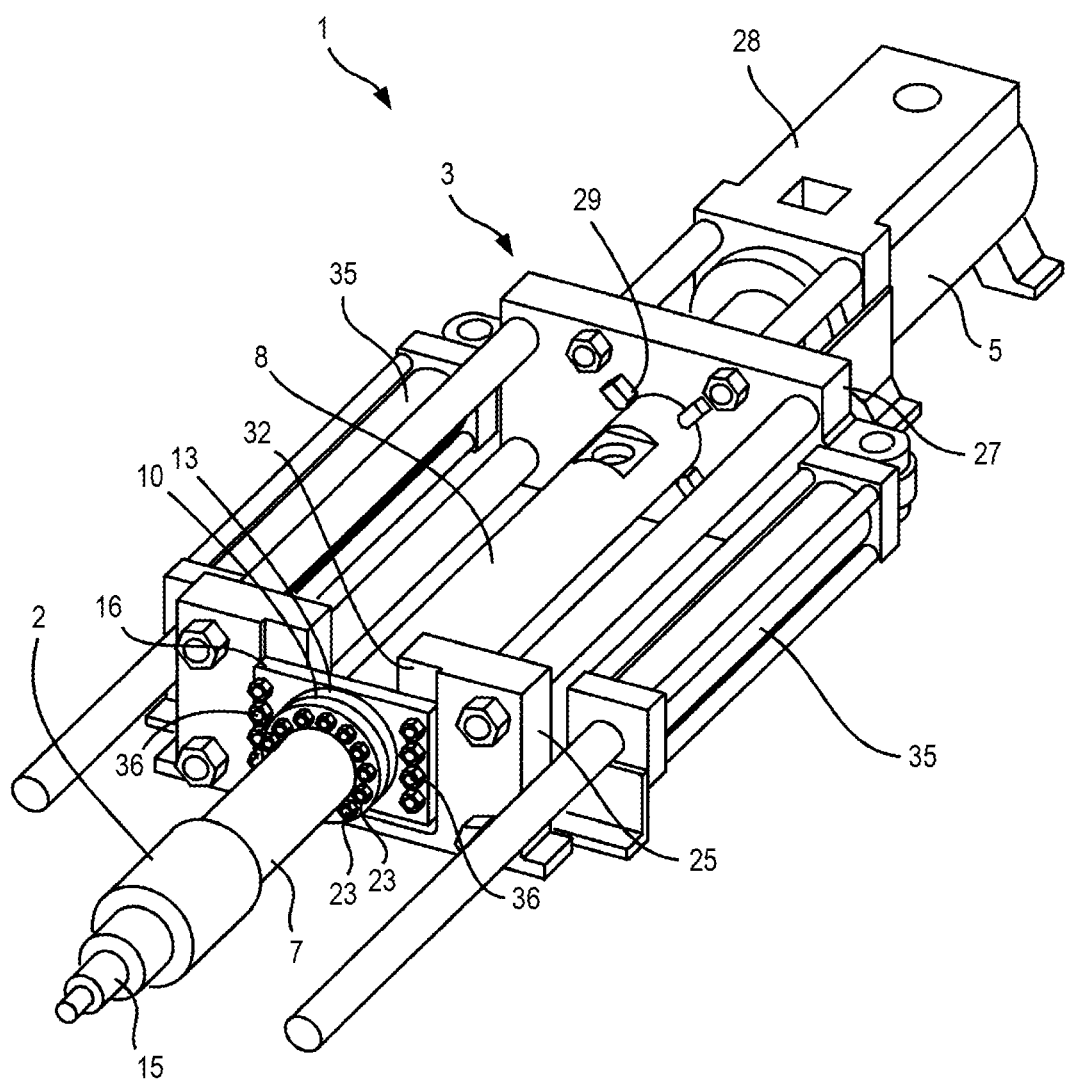
FIG. 1 is a perspective view illustrating an injection device according to an illustrative embodiment of the present disclosure.

Illustrative embodiments of the present disclosure will be described. Although the injection device according to the present disclosure may be provided for a general injection molding machine which injects a resin material, it is provided for a so-called metal injection molding machine which injects a metal material in the present illustrative embodiment. An injection device 1 according to the present illustrative embodiment is configured by a heating cylinder 2, a support frame 3 supporting the heating cylinder 2, and the like, as illustrated in FIG. 1. Although not illustrated in FIG. 1, a screw is provided inside the heating cylinder 2 and is driven in a rotation direction and an axial direction by a predetermined drive mechanism 5 which is provided on a rear end portion of the support frame 3.

Figure 2A:
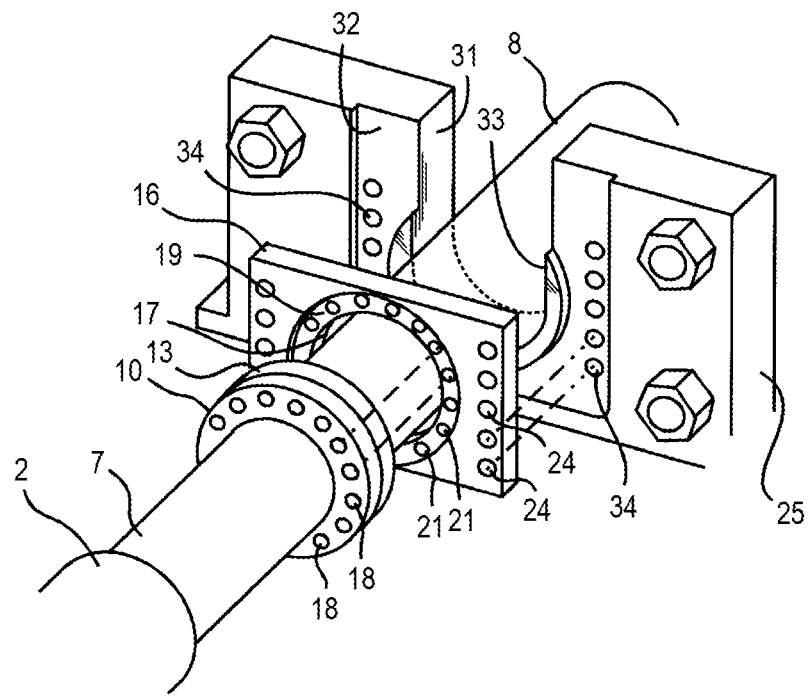
Figure 2B:
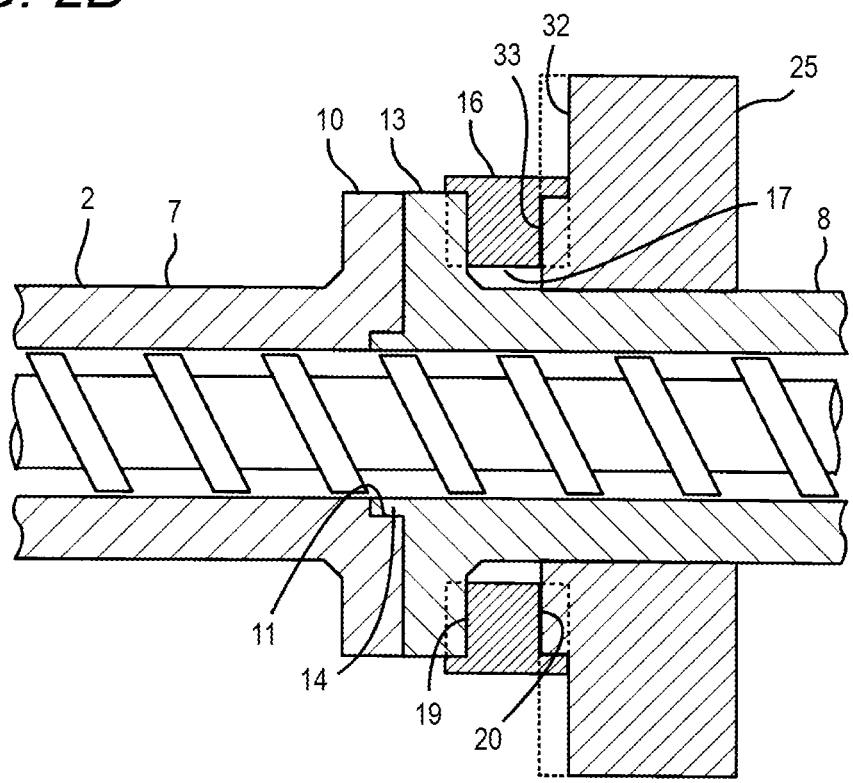
Figure 3:
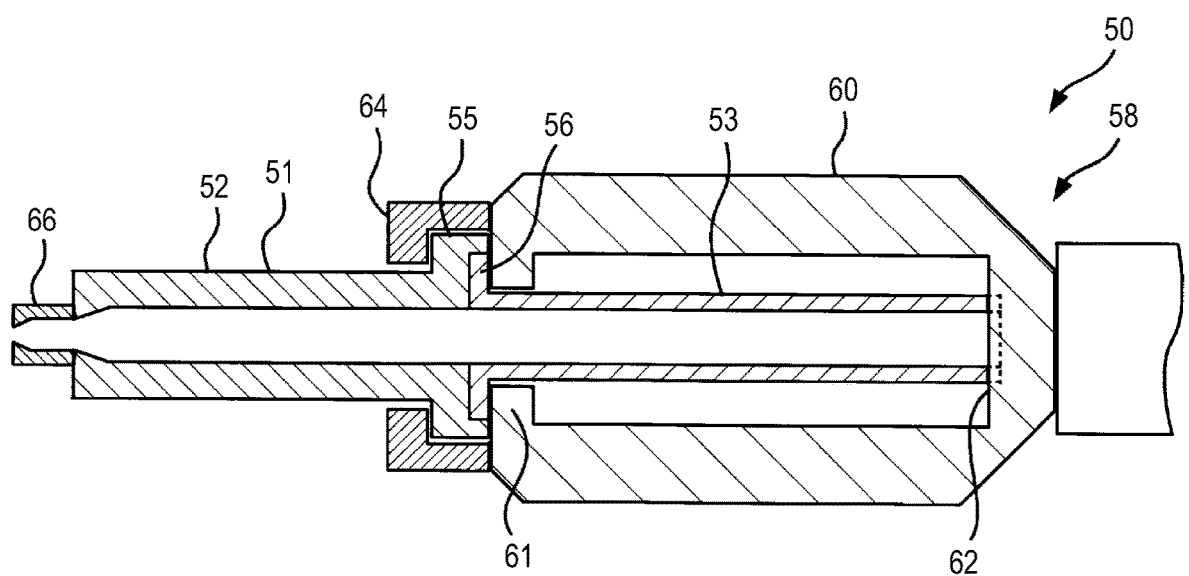
FIG. 3 is a front sectional diagram illustrating an injection device of the related art.

Although the injection device 1 according to the present illustrative embodiment has several features, the injection device 1 primarily has features in the heating cylinder 2. In other words, the heating cylinder 2 is configured by two cylinder members, that is, a front-proximal front cylinder 7 and a rear-proximal rear cylinder 8 and the two are connected to each other in the longitudinal direction. A flange portion 10 having an expanded external diameter at the rear end portion is formed on the front cylinder 7 as illustrated in FIG. 2B. A step portion 11 of a predetermined width having an expanded diameter bore is formed at the rear end portion. A flange portion 13 similarly having an expanded external diameter is formed on the distal end portion of the rear cylinder 8 in the same manner as on the front cylinder 7. An annular protruding portion 14 which stands in a ring shape at a predetermined height only in the vicinity of the bore is formed on the end surface of the distal end of the rear cylinder 8. The step portion 11 and the annular protruding portion 14 form a spigot joint, and when the front cylinder 7 and the rear cylinder 8 abut against each other at the flange portions 10 and 13, respectively, the annular protruding portion 14 is smoothly inserted into and water-tightly connected to the step portion 11. Multiple bolt holes 18, 18, . . . are opened in the flange portions 10 and 13 of the front cylinder 7 and the rear cylinder 8 in a circumferential direction as illustrated in FIG. 2A, the flange portions 10 and 13 are fixed to a joining plate 16 described next by using bolts, thereby integrally fixing the front cylinder 7 and the rear cylinder 8 to each other. An injection nozzle 15 is provided on the front of the front cylinder 7 in the same manner as in the heating cylinder of the related art as illustrated in FIG. 1. Although the heating cylinder 2 is driven forward by the support frame 3 when the injection nozzle 15 is caused to touch the mold as described later, at this time, an axial force acts on the heating cylinder 2 via the flange portions 10 and 13.

The joining plate 16 is, as illustrated in FIG. 2A, formed from a rectangular plate having a predetermined plate thickness, a circular hole 17 being opened in the center of the joining plate 16, and the rear cylinder 8 is inserted into the hole 17. A circular step portion 19 that is shallowly carved out in a disc shape is formed in the periphery of the hole 17 in one surface of the joining plate 16. The diameter of the disc of the circular step portion 19 is just slightly larger than the flange portion 13 of the rear cylinder 8, and a portion of the flange portion 13 is smoothly fitted into the circular step portion 19 without a significant gap. Therefore, it is possible to precisely center the rear cylinder 8 and the joining plate 16. As illustrated in FIG. 2B, a circular step portion 20 that is shallowly carved out in a round shape is also formed in the periphery of the hole 17 in the other surface of the joining plate 16, and a predetermined portion of a flange plate 25 of the support frame 3 which is described later is fitted into the circular step portion 20 and centered, that is, positioned. Multiple bolt holes 21, 21, . . . are formed in the joining plate 16 along the circumferential direction in the circular step portion 19. As illustrated in FIG. 1, the front cylinder 7, the rear cylinder 8, and the joining plate 16 are integrally fixed to each other using bolts 23, 23, . . . . Bolt holes 24, 24, . . . are opened in the joining plate 16 in the vicinity of both short sides of the rectangle, and it is possible to fix the joining plate 16 to the flange plate 25 by using bolts.

The injection device 1 according to the present illustrative embodiment also has a feature in the support frame 3. In addition to an intermediate plate 27 supporting the heating cylinder 2 at the rear end portion of the heating cylinder 2 and a drive mechanism frame portion 28 provided with the drive mechanism 5 which drives the screw, the support frame 3 is provided with the flange plate 25 supporting the heating cylinder 2 in the vicinity of the center of the heating cylinder 2 in the longitudinal direction. The intermediate plate 27 and the drive mechanism frame portion 28, and the intermediate plate 27 and the flange plate 25 are coupled to each other in a fixed manner by using a plurality of rods between each. In the present illustrative embodiment, although a support mechanism 29 supporting the heating cylinder 2 is provided on the intermediate plate 27, by merely loosely supporting the rear end portion of the heating cylinder 2, the support mechanism 29 does not restrict movement in the rotation direction and the axial direction of the heating cylinder 2 at this portion. The support mechanism 29 is provided simply to center the rear end portion of the heating cylinder 2 and the intermediate plate 27.

The flange plate 25 is a characteristic member in the injection device 1 according to the present illustrative embodiment and is rectangular as illustrated in FIG. 2A. Since the heating cylinder 2 is pushed when causing the injection nozzle 15 to touch the mold, a load acts on the flange plate 25. A repulsive force also acts on the flange plate 25 during the injection. Therefore, the flange plate 25 is formed at a predetermined plate thickness. A comparatively large U-shaped opening portion 31 which reaches the center portion from the top end is formed in the flange plate 25, and the rear cylinder 8 of the heating cylinder 2 is configured to be inserted into the U-shaped opening portion 31. A step portion 32 which is shallowly carved out in a large rectangular shape is formed in the front surface of the flange plate 25 to leave a circular portion in the center portion of the front surface of the flange plate 25. When the joining plate 16 is inserted into the step portion 32, the end surfaces of both sides of the step portion 32 loosely touch the pair of side surfaces of the joining plate 16. A circular platform shaped protruding portion 33 which remains in the center of the step portion 32 is configured to fit into the circular step portion 20 which is formed in the joining plate 16. The step portion 32 and the protruding portion 33 of the flange plate 25 side and the pair of side surfaces of the joining plate 16 and the circular step portion 20 form guide portions for precisely positioning the joining plate 16 against the flange plate 25. Bolt holes 34, 34, . . . for fixing the joining plate 16 are opened in the step portion 32 of the flange plate 25.

A pair of piston cylinder units 35, 35 is provided on the support frame 3 provided with this flange plate 25 as illustrated in FIG. 1. The pistons of the piston cylinder units 35, 35 are connected to a fixing board which is not illustrated. Therefore, the support frame 3 is driven in the axial direction when the piston cylinder units 35, 35 are driven, and the heating cylinder 2 is driven forward such that the injection nozzle 15 touches the mold.

In the injection device 1, it is necessary to remove and attach the heating cylinder 2 and the screw with respect to the support frame 3 for appropriate maintenance. The method will be described First, the heating cylinder 2 is assembled. In other words, the front cylinder 7 and the rear cylinder 8 are caused to abut the flange portions 10 and 13, respectively, and the rear cylinder 8 is inserted into the hole 17 of the joining plate 16 to cause the joining plate 16 to abut against the flange portion 13 of the rear cylinder 8. Therefore, the front cylinder 7, the rear cylinder 8, and the joining plate 16 are precisely positioned, that is, centered. The front cylinder 7, the rear cylinder 8, and the joining plate 16 are fixed by using the bolts 23, 23 . . . . The heating cylinder 2 is assembled. In the present illustrative embodiment, the heating cylinder 2 which is assembled in this manner will not be disassembled as long as it is not necessary to do so, and in the attachment and detachment with respect to the support frame 3, the heating cylinder 2 is removed from and attached to the support frame 3 as it is in an assembled state.

The heating cylinder 2 is attached to the support frame 3. The screw is inserted into the heating cylinder 2 in advance, the body portion of the rear cylinder 8 of the heating cylinder 2 is inserted into the U-shaped opening portion 31 of the flange plate 25, and the rear end portion of the rear cylinder 8 is inserted into the support mechanism 29 of the intermediate plate 27. Therefore, the joining plate 16 abuts against the step portion 32 of the flange plate 25 and is precisely positioned, that is, centered. As illustrated in FIG. 1, the joining plate 16 is fixed to the flange plate 25 by using bolts 36, 36. Accordingly, movement of the heating cylinder 2 in an axial direction (e.g., in a direction toward the distal end) and rotation of the heating cylinder 2 can be restricted. The attachment of the support frame 3 of the heating cylinder 2 is completed. When removing the heating cylinder 2 from the support frame 3, the reverse work may be executed.

In the injection device 1 according to the present illustrative embodiment, the heating cylinder 2 is supported by the support frame 3 at the flange portions 10 and 13, and the movement in the axial direction and the rotation direction is restricted at the flange portions 10 and 13. Meanwhile, although the rear end portion of the heating cylinder 2 is supported by the support mechanism 29 of the intermediate plate 27, the movement in the axial direction and the rotation direction is not restricted. In other words, it can be said that the heating cylinder 2 is supported in a state in which the movement in the axial direction and the rotation direction is restricted in the vicinity of the center in the longitudinal direction. Therefore, when driving the piston cylinder units 35, 35 to cause the injection nozzle 15 to touch the mold, the axial force acting on the heating cylinder 2 only acts substantially on the front portion from the flange portions 10 and 13, that is, the front cylinder 7. Even if the axial force acts on the front cylinder 7, since the length of the front cylinder 7 is short, there is no concern of deformation caused by buckling. When the screw is rotated and the injection material is plasticized, although a torsion force caused by the rotation force acts on the heating cylinder 2, the shearing stress acting on the heating cylinder 2 itself only reaches a maximum in the vicinity of the flange portions 10 and 13, and the magnitude of the shearing stress is comparatively small. In other words, the heating cylinder 2 has great strength with respect to torsion in the injection device 1 according to the present illustrative embodiment. Although a broad explanation is given of the fact that the position of the flange portions 10 and 13 in the length direction of the heating cylinder 2, that is, the support position is in the vicinity of the center of the length of the heating cylinder 2, as long as the support position is a position approaching the distal end portion of the heating cylinder 2 from the rear end portion thereof by ⅓ to ⅔ of the length of the heating cylinder 2, the effects described above may be obtained.

What is claimed is:

1. An injection device comprising:
    a heating cylinder;
    a screw provided to be drivable in an axial direction and a rotation direction inside the heating cylinder; and
    a support frame supporting the heating cylinder,
    wherein the heating cylinder is supported by the support frame in a state in which movement in the axial direction and rotation are restricted at a support position, the support position being a position close to a distal end portion by ⅓ to ⅔ of a length of the heating cylinder from a rear end portion of the heating cylinder,
    wherein a flange is formed on the heating cylinder at the support position,
    wherein the support frame includes a flange plate,
    wherein the heating cylinder is supported by the support frame due to the flange being fixed to the flange plate,
    wherein a joining plate is fixed to the flange and sandwiched between the flange and the flange plate,
    wherein the flange is detachably fixed to the flange plate via the joining plate, and
    wherein a guide portion is formed on one or both of the joining plate and the flange plate, and the joining plate is positioned by the guide portion to be fixed to the flange plate.

2. The injection device according to claim 1,
    wherein the joining plate is detachably fixed to the flange plate via the guide portion.

3. The injection device according to claim 1,
    wherein the support frame is provided with an intermediate plate,
    wherein the intermediate plate comprises a support mechanism supporting the heating cylinder, and
    wherein the support mechanism is configured to loosely support the rear end portion of the heating cylinder.

4. The injection device according to claim 1,
wherein the heating cylinder comprises:
- a front cylinder comprising a first flange portion having an expanded external diameter at a rear end portion of the front cylinder; and
- a rear cylinder comprising a second flange portion having an expanded external diameter formed on a distal end portion of the rear cylinder, wherein the expanded external diameter of the first flange portion and the expanded external diameter of the second flange portion are substantially the same, wherein the front cylinder and the rear cylinder are connected to each other in an longitudinal direction of the heating cylinder, and wherein the flange comprises the first flange portion and the second flange portion.

5. The injection device according to claim 1, wherein the heating cylinder comprises:
- a front cylinder comprising a step portion at a rear end portion of the front cylinder; and
- a rear cylinder comprising an annular protruding portion standing in a ring shape at a predetermined height from a distal end portion of the rear cylinder, and wherein when the rear end portion of the front cylinder and the distal end portion of the rear cylinder abut against each other, the annular protruding portion is inserted into and water-tightly connected to the step portion.

6. The injection device according to claim 1,
wherein the support frame is configured to support the heating cylinder to restrict the movement of the heating cylinder toward the distal end portion at the support position.

7. An injection device comprising:
- a heating cylinder comprising a front cylinder having a first flange and a rear cylinder having a second flange;
- a screw provided to be drivable in an axial direction and a rotation direction inside the heating cylinder; and
- a support frame supporting the heating cylinder, the support frame comprising a flange plate that is located behind the second flange in the axial direction, wherein the front cylinder and the rear cylinder are integrally fixed to each other by the first flange and the second flange being fixed to a joining plate, and wherein the heating cylinder is supported by the support frame in a state in which movement in the axial direction and rotation are restricted at a support position, the heating cylinder being supported by the support frame due to the joining plate being fixed to the flange plate.

\* \* \* \* \*